US011589116B1

(12) United States Patent
Omar et al.

(10) Patent No.: US 11,589,116 B1
(45) Date of Patent: Feb. 21, 2023

(54) DETECTING PRURIENT ACTIVITY IN VIDEO CONTENT

(71) Applicant: Amazon Technologies, Inc., Seattle, WA (US)

(72) Inventors: Mohamed Kamal Omar, Seattle, WA (US); Xiaohang Sun, Seattle, WA (US); Ivan Ryndin, Shoreline, WA (US); Tai-Ching Li, Issaquah, WA (US); Alexander Ratnikov, Redmond, WA (US); Muhammad Raffay Hamid, Seattle, WA (US); Ahmed Aly Saad Ahmed, Bothell, WA (US); Travis Silvers, Lynnwood, WA (US); Hanxiao Deng, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/306,671

(22) Filed: May 3, 2021

(51) Int. Cl.
*H04N 21/4545* (2011.01)
*H04N 21/454* (2011.01)
*H04N 21/45* (2011.01)

(52) U.S. Cl.
CPC ... *H04N 21/45457* (2013.01); *H04N 21/4524* (2013.01); *H04N 21/4542* (2013.01)

(58) Field of Classification Search
None
See application file for complete search history.

(56) References Cited

U.S. PATENT DOCUMENTS

| | | | | |
|---|---|---|---|---|
| 6,553,566 B1 * | 4/2003 | Grant | ............... | H04N 7/0885 |
| | | | | 348/E7.039 |
| 6,684,240 B1 * | 1/2004 | Goddard | ............ | H04N 21/4542 |
| | | | | 707/999.005 |
| 6,850,252 B1 * | 2/2005 | Hoffberg | ............... | H04N 21/475 |
| | | | | 380/252 |
| 8,112,784 B1 * | 2/2012 | Jackson | ............ | H04N 21/4122 |
| | | | | 348/565 |

(Continued)

FOREIGN PATENT DOCUMENTS

CN 101341718 A * 1/2009 ............. G06F 21/10

OTHER PUBLICATIONS

U.S. Appl. No. 17/215,816, "Frame-Based Body Part Detection in Video Clips," filed Mar. 29, 2021, 70 pages.

(Continued)

*Primary Examiner* — William J Kim
(74) *Attorney, Agent, or Firm* — Kilpatrick Townsend & Stockton LLP

(57) ABSTRACT

Techniques are disclosed for detecting a type of prurient activity shown by a portion of video content. In an example, a machine learning model of a computer system may receive a second portion of video content, the machine learning model including a neural network that is trained to analyze a temporal dimension of the second portion. The machine learning model determines a score indicating a likelihood that the video content shows the type of prurient activity based in part on applying a three-dimensional filter to the second portion of the video content. The computer system then generates a video clip that includes at least the portion of the video content showing the type of prurient activity based on the score, and provides the video clip for display.

15 Claims, 8 Drawing Sheets

(56) References Cited

U.S. PATENT DOCUMENTS

| | | | | |
|---|---|---|---|---|
| 8,346,953 B1* | 1/2013 | Hew | H04N 21/4755 | 709/201 |
| 8,843,953 B1* | 9/2014 | Dang | H04N 21/4542 | 725/28 |
| 9,363,561 B1* | 6/2016 | Harmon | H04N 21/26258 | |
| 9,563,845 B1* | 2/2017 | Porter | G06F 16/9535 | |
| 9,980,004 B1* | 5/2018 | Ericson | G06V 10/7553 | |
| 10,088,983 B1* | 10/2018 | Qaddoura | H04N 21/23439 | |
| 2002/0147782 A1* | 10/2002 | Dimitrova | H04N 21/4394 | 709/207 |
| 2004/0003393 A1* | 1/2004 | Gutta | H04N 21/454 | 348/E5.112 |
| 2004/0006767 A1* | 1/2004 | Robson | H04N 21/4542 | 725/31 |
| 2005/0052578 A1* | 3/2005 | Phillips | H04N 21/435 | 348/E7.078 |
| 2007/0053513 A1* | 3/2007 | Hoffberg | H04N 21/475 | 380/201 |
| 2009/0288112 A1* | 11/2009 | Kandekar | H04N 21/4532 | 725/32 |
| 2011/0283311 A1* | 11/2011 | Luong | H04N 21/44213 | 725/28 |
| 2012/0311625 A1* | 12/2012 | Nandi | H04N 21/4532 | 725/28 |
| 2013/0185765 A1* | 7/2013 | Hew | H04N 21/4782 | 726/3 |
| 2015/0003811 A1* | 1/2015 | Kandekar | G06F 16/4393 | 386/261 |
| 2015/0070516 A1* | 3/2015 | Shoemake | H04N 21/4542 | 348/207.11 |
| 2015/0334442 A1* | 11/2015 | Charan | H04N 21/4821 | 725/44 |
| 2016/0323643 A1* | 11/2016 | Panchaksharaiah | H04N 21/4753 | |
| 2017/0272818 A1* | 9/2017 | Gattis | H04N 21/44008 | |
| 2017/0289624 A1* | 10/2017 | Avila | H04N 21/4545 | |
| 2018/0332347 A1* | 11/2018 | Hamiti | H04N 21/435 | |
| 2018/0376205 A1* | 12/2018 | Oswal | G02B 27/0172 | |
| 2019/0122082 A1* | 4/2019 | Cuban | G09G 3/20 | |
| 2019/0373322 A1* | 12/2019 | Rojas-Echenique | G06F 16/75 | |

OTHER PUBLICATIONS

Carreira et al., "Quo Vadis, Action Recognition? A New Model and the Kinetics Dataset," Conference on Computer Vision and Pattern Recognition, 2017, 10 pages.

Kay et al., "The Kinetics Human Action Video Dataset," Available Online at: https://arxiv.org/pdf/1705.06950.pdf, May 2017, 22 pages.

Wang et al., "Non-Local Neural Networks", Conference on Computer Vision and Pattern Recognition, 2018, 10 pages.

* cited by examiner

DETECTING PRURIENT ACTIVITY IN VIDEO CONTENT

BACKGROUND

Multimedia distribution services exist that service different markets (e.g., target customers and/or geographic regions). For example, a distribution service may distribute video content in Japan, India, and the United States (U.S.), among other regions. Each region may have different rules and/or standards that apply, with respect to what types of video content may be shown in a particular region. For example, the U.S. may allow video content to be published (e.g., for a general audience) that shows one type of sexual activity (e.g., kissing), while India may not allow such video content to be shown. In recent times, with a dramatic increase in the amount of video content being submitted by content producers for publishing online, it may be challenging for the distribution service to adequately perform a compliance review on each submitted video content. This becomes especially challenging when the distribution service must take into account the different compliance rules per region.

BRIEF DESCRIPTION OF THE DRAWINGS

Various embodiments in accordance with the present disclosure will be described with reference to the drawings, in which.

DETAILED DESCRIPTION

Figure 1:
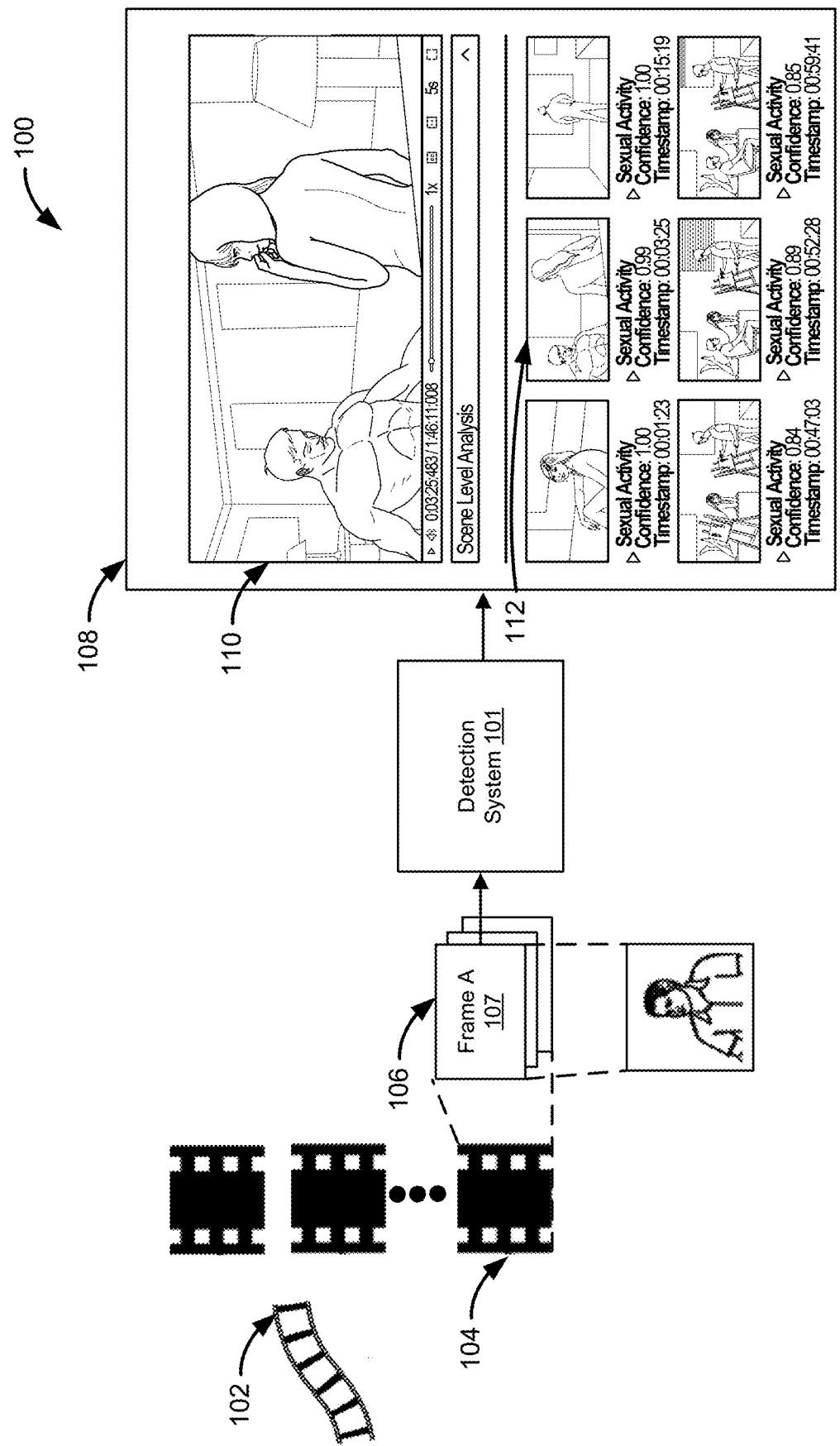
FIG. 1 is a schematic diagram illustrating an example detection system for determining if a video content shows a type of prurient activity, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, techniques for detecting a prurient activity shown in a portion of video content. Consider an example in which a computer system receives a video clip (e.g., of a movie title) that includes a sequence of frames. A portion of the video clip shows a type of prurient activity (e.g., an activity that encourages a significant level of sexual interest), for example, two people engaged in kissing for a period of time. A machine learning (ML) model of the computer system is trained to analyze the video clip and generate a score that indicates a likelihood that the video clip shows prurient activity corresponding to one of a plurality of types of prurient activities that the ML model is trained to recognize. The ML model includes a neural network that is trained to analyze a temporal (e.g., time) dimension associated with a sequential subset (e.g., a plurality of frames) of the sequence of frames of the video clip. Accordingly, the ML model analyzes the video clip and generates the score for the video clip. The computer system then provides at least the portion of the video clip showing the type of prurient activity for presentation on a display, for example, to be used for performing a compliance evaluation of whether the video clip is suitable for distribution to a particular target entity (e.g., a particular geographic region). In this way, embodiments, techniques may provide a more efficient subsequent evaluation of video content that is more likely to show prurient activity.

To further illustrate, consider an example in which a multimedia distribution service receives and/or maintains a collection of video contents (e.g., including movie titles, television (TV) shows, video recordings from user devices that are uploaded to the distribution service, etc.). The multimedia distribution service selects a particular video title (e.g., a particular movie title) for distribution to one or more regions. Each region has different applicable rules that govern what types of content may (or may not) be shown in that region. In this example, suppose that India is one of the target regions and that India restricts distribution of content that shows any one or more of a plurality of prurient activity types that are associated with provoking a significant (e.g., excessive) amount of sexual interest or desire. Some non-limiting examples of prurient activity types may include sexual intercourse, sexual touching of clothed (or unclothed) genitalia, erotic dancing, kissing, dancing, oral sex, use of sex toys, etc. In some embodiments, a prurient activity may correspond with an activity that occurs over a period of time (e.g., being captured over a plurality of video frames). In some embodiments, a prurient activity may involve one or more people (and/or interaction with objects), and may (or may not) involve nudity. In some embodiments, a type of prurient activity may be predefined by a governing body (e.g., a government).

In this example, a computer system of the multimedia distribution service may receive video content (e.g., a video clip) that corresponds to at least a portion (e.g., all, or a subset) of the particular video title. The video content that is received by the computer system may include a sequence of frames. Meanwhile, the computer system may include one or more ML models. In this example, one ML model may be trained to determine a score indicating a likelihood that the video content shows any one or more of the plurality of prurient activities types. The ML model may include one or more neural networks (e.g., convolutional neural networks (CNNs)). The ML model may utilize one or more three-dimensional (3D) filters that are applied to portions of the sequence of frames to generate one or more feature maps. A portion of the sequence of frames may include a receptive field that is a 3D data object. The 3D data object may be associated with a height dimension (e.g., of a frame of the video content), a width dimension (e.g., of a frame of the video content), and a temporal dimension (e.g., associated with a number of frames of the portion of the sequence of frames). The ML model may be trained to generate a prediction (e.g., classification) score based on the one or more generated feature maps. It should be understood that, by training the ML model based in part on a temporal dimension (e.g., in addition to height and width dimensions), the ML model may be more optimized for detecting types of activity that spans multiple frames. For more information about an example ML model that may be utilized to perform techniques described herein, see Joao Carreira and Andrew Zisserman, "Quo Vadis, Action Recognition? A New Model and the Kinetics Dataset," arXiv:1705.07750v3 [cs.CV] 12 Feb. 2018.

Although, in this example, the ML model may be trained to predict a binary classification score of whether the video content contains any one of the plurality of prurient activity types, embodiments should not be construed to be so limited. For instance, in another example, the ML model may include a plurality of ML models (e.g., sub-models), each ML model being trained to predict whether the video content shows a particular type of prurient activity (e.g., of the plurality of prurient activity types). In this other example, the ML model may thereby generate a plurality of scores, respectively for each type of prurient activity.

Continuing with the earlier example, upon generating the score (e.g., a value between 0 and 1), the computer system determines that the probability score matches (e.g., is greater than or equal to) a threshold value, for example, 90%. Accordingly, the computer system determines to provide the video clip for presentation on a display. In one example application, the video clip may be presented on a display for subsequent use in performing a compliance evaluation of the video clip. For example, using the illustration above, suppose that the multimedia distribution service employs an agent (e.g., a human operator) to review video content as part of a compliance process, to ensure that the video content is suitable for distribution in one or more regions (e.g., including India). In this example, instead of the agent being presented with a single (e.g., monolithic) video, in which the agent reviews the video content from end-to-end (e.g., consuming significant time and/or computing resources), the computer system may instead present on a graphical user interface (GUI) of a display device only those video clips (e.g., including the video clip under review) that are determined to be likely to show prurient activity.

In some embodiments, the computer system may generate a plurality of video clips from a given video title. For example, the computer system may generate (e.g., splice) a sequence of short video clip segments (e.g., five seconds each). The computer system may detect, for each video clip segment, whether a type of prurient activity is shown. If yes, the computer system may present the one or more video clip segments that are, respectively, likely to be showing prurient activity. In some cases, the computer system may concatenate multiple video clip segments together (e.g., into a longer one-minute video clip), and then may subsequently present the concatenated video clip if it contains least one video clip segment that likely shows a type of prurient activity. It should be understood that any suitable presentation of one or more video clips and/or video clip segments may be utilized to perform embodiments described herein.

In another example application, the score may be used to present one or more video clips to an end-user for evaluation. For example, suppose that the detection system determines that one or more portions of a video title may respectively show prurient activity. The detection system may present these portions (e.g., video clips) to a GUI of a display of a user device of the end-user (e.g., a child guardian). The end user may thus be able to efficiently evaluate whether the movie has content that is not suitable for the child based on evaluating the one or more video clips.

In some embodiments, as described above, techniques may be used to generate a score that indicates whether a video clip shows a particular type of prurient activity (e.g., of a plurality of prurient activity types). In some embodiments, this may enable several additional practical applications. For example, a user (e.g., an end-user and/or compliance officer) may be able to sort and/or filter content based on one or more types of prurient activity they are searching for. In another example, different regions may have different governing rules with respect to which prurient activity types are permitted (or not permitted) for distribution in the respective regions. In some embodiments, a user (e.g., a compliance officer) may efficiently evaluate video clips on a per-region basis, whereby a subset of video clips (e.g., of a given movie title) are presented to the user, depending on the particular set of prurient activity types prohibited for each region.

Embodiments described herein provide several technical advantages over conventional techniques. For example, techniques described herein provide a more efficient and accurate process for detecting prurient activity in video content. In one example, techniques described herein may utilize a machine learning model that is trained to detect activity over time (e.g., along a temporal dimension). The ML model may also be trained using video content that shows one or more types of prurient activity. Accordingly, the machine learning model may generate one or more probability scores with higher recall and/or precision than conventional methods. The ML model may also be trained to generate scores for short video clip segments (e.g., five seconds each), which may be more efficient than other models that may analyze an entire video (e.g., a movie title).

In another example of a technical advantage, techniques provide a more efficient evaluation and/or profile configuration process by users (e.g., compliance officers and/or agents of the multimedia distribution service, end-users). For example, techniques may enable generation of a plurality of scores, each score indicating a probability of a specific type of prurient activity being shown in a video content. This may enable presentation of video content that enables more efficient sorting of content, evaluation of content, and/or updating profile settings to block (or permit) certain types of activities within one or more video contents. It should be understood that this process may applied with respect to multiple regions and/or customer types. Also, the process may be performed over a large number of videos (e.g., received by the multimedia distribution service) that grows daily. Accordingly, the aggregate amount of time and/or computing resources that may be more efficiently utilized is significant.

For clarity of illustration, embodiments described herein may typically refer to a process for detecting one or more types of prurient activity, whereby the activity is performed over a period of time that is represented by a sequence of frames. However, embodiments should not be construed to be so limited. For example, techniques described herein may be applicable to any suitable type of activity shown in video content (e.g., types of violent activity, such as firing a gun, punching an individual, etc.). Also, although techniques described herein may be primarily described in the context of a multimedia distribution service enabling a more efficient compliance review of video content, embodiments should not be construed to be so limited. For example, techniques are also applicable to other applications, including, but not limited to, providing end-users with warnings regarding content that may not be suitable for a particular audience. In another example, techniques may be used to blur an activity that may include inappropriate content for a particular audience, and/or to skip through portions of a video content that are known to contain inappropriate prurient activity.

FIG. 1 is a schematic diagram illustrating an example detection system for determining if a video content shows a type of prurient activity, in accordance with various embodiments. In diagram 100 of FIG. 1, the example system includes a detection system 101, a video file 102, and a graphical user interface (GUI) 108 of a display (e.g., of a user device). As described further herein, the detection system 101 may receive a video clip segment 104 that includes a portion of video content of the video file 102. The detection system 101 may analyze the video clip segment 104 to determine a score indicating a likelihood that the video clip segment 104 shows a type of prurient activity of a plurality of prurient activity types. If the score matches a predefined threshold value (e.g., 90%), the detection system 101 may provide a video clip that includes the video clip segment 104 for presentation on the GUI 108.

Turning to the video file 102 in further detail, the video file 102 may correspond to any suitable container for a particular video content. Some non-limiting examples of video file formats may be MPEG-4 Part 14 ("MP4"), QuickTime ("MOV"), Audio Video Interleave ("AVI"), etc. Some non-limiting examples of video contents may include movies, TV shows, video advertisements, documentaries, home videos, etc. In some embodiments, the video file 102 may include both a video track and an audio track. In some embodiments, the video file 102 may not include an audio track.

The video content of video file 102 may include a sequence of frames (e.g., a plurality of frames). In the example of diagram 100, the video file 102 may be divided (e.g., spliced) into one or more video clip segments (e.g., shorter segments, such as five second segments, ten second segments, etc.), including video clip segment 104. The video clip segment 104 itself may include a sequence of frames 106 (e.g., including frame A 107, as depicted in diagram 100). In some embodiments, a video clip segment (and/or video clip) may be contained within a similar (or different) container format as the video file 102. Each frame the video clip segment 104 may show any suitable content. For example, frame A 107 shows a person's face and a portion of their torso. As described further herein, in reference to FIG. 2, the video file 102 may be partitioned into any suitable one or more video clip segments 104 and/or further aggregated (e.g., concatenated) into video clips that respectively include one or more video clip segments.

Turning to the detection system 101 in further detail, the detection system 101 may correspond to any suitable computer system. For example, this may include a personal computer (PC), a server computer, or a cluster of server computers. In one example, the cluster of server computers may operate within a computing cloud.

As described further herein, the detection system 101 may receive video clip segment 104, and extract a portion of video content from the video clip segment 104. In some embodiments, the portion may correspond to a plurality of frames that corresponds to a sequential subset of the sequence of frames of the video clip segment. In some embodiments, a machine learning (ML) model of the detection system 101 may analyze the portion to determine one or more features of a feature map. It should be understood that the sequential subset of frames of the portion (e.g., corresponding to a number of frames of the portion) may be associated with a temporal dimension. For example, the sequential subset of frames may be associated with an activity (e.g., a movement) that occurs over time, for example, faces kissing for a period of time, human bodies interacting together in a particular way, etc. In addition to analyzing frames on a two-dimensional basis (e.g., associated with a height and width of a frame), the ML model may further be trained to analyze the temporal dimension of respective portions (e.g., including overlapping portions) of the video clip segment 104. In some embodiments, as described further with respect to FIG. 3, the ML model may be trained to recognize one or more types of prurient activity, whereby a type of prurient activity may be associated with a temporal dimension. Accordingly, based on this analysis, the ML model may generate a score (e.g., a probability score between 0 and 1) for the video clip segment 104, whereby the score indicates a likelihood that the video clip segment 104 shows prurient activity corresponding to one of a plurality of prurient activity types.

In some embodiments, the ML model may be trained to recognize any suitable type of prurient activity that may provoke a significant (e.g., excessive) amount of sexual interest or desire. This may include, for example, sexual activities associated with pedophilia (e.g., involving sexual behaviors directed towards children), bestiality (e.g., involving sexual activities between humans and animals), necrophilia (e.g., involving sexual activities including deceased people), etc. It should be understood that these activities may (or may not) involve nudity (e.g., showing a uncovered portion of a body within one or more frames). For example, an adult involved with pedophilic activity with a child (e.g., kissing the child) may be clothed. In some embodiments, a prurient type of activity may (or may not) show explicit sexual penetration. In some embodiments, the prurient type of activity may (or may not) show anatomical detail. In some embodiments, various amounts of anatomical detail may be shown. For example, in one example, two people may be shown having sex and are nude, while their specific genitalia may not be shown. In another example, only the genitalia of a person may be visible, for example, depicting the use of a sex toy in a sexual content. Another example of a type of prurient activity may include paraphilia (e.g., involving atypical sexual desires, typically involving extreme or dangerous activities) and/or fetishes (e.g., expressing sexual desire for a particular object, particular clothes, and/or a particular part of the body). In some embodiments, prurient activity may correspond to various types of body touching involving one or more people (e.g., including masturbation, fondling, etc.). In some embodiments, prurient activity may include other types of activities, such as strip-teasing or erotic dancing. In some embodiments, a prurient activity may be defined based in part on the length of the activity. For example, in some embodiments, kissing may be considered a prurient activity, depending in part on the length of the kiss (e.g., whether it is a sustained kiss for more than three seconds). In some embodiments, a prurient activity may be defined based in part on an amount and/or type of movement involved. For example, sexual activity between people that may involve abusive activity or otherwise excessive (e.g., exploitive and/or violent) sexual activity may be defined as prurient activity. In some embodiments, prurient activity may include depictions of sexual handling of animal genitalia, simulated depictions of minors in sexual scenarios, sexual activity in various types positions, etc. It should be understood that the examples of prurient activity described herein are non-limiting examples of types of prurient activity. The detection system 101 may train the ML model to detect any suitable type of prurient activity.

In some embodiments, a plurality of prurient activity types may be defined by the detection system 101. For example, the detection system 101 may receive input from one or more sources (e.g., one or more regions, governing bodies, etc.) that classify particular types of activity as being types of prurient activity. In some embodiments, prurient activity type definitions may vary between regions. For example, one region may define kissing for more than three seconds as a prurient activity, while another region may define kissing for more than ten seconds as a prurient activity. The ML model of detection system 101 may be trained to detect various types of prurient activity, according to the definitions of each region. Furthermore, a governing body for a particular region may determine to prohibit (or allow) different types of prurient activity from being distributed in that region. For example, one region may allow showing two fully clothed people cuddling (e.g., as a type of prurient activity), while another region may prohibit this type of activity from being shown.

In some embodiments, the detection system 101 may generate one or more scores and/or labels associated with a detected activity within the video clip segment 104. For example, in some embodiments, the ML model may label the activity according to a binary classification, for example, either being a type (e.g., any type) of prurient activity or not being a type of prurient activity. In some embodiments, an ML model of detection system 101 may automatically determine a probability score that an activity shown by the video clip segment 104 corresponds to a particular type of prurient activity (e.g., sexual intercourse). In some embodiments, one or more scores (and/or labels or sub-labels) may be assigned to categorize a particular prurient activity. Also, it should be understood that one or more types of prurient activity may be shown, detected, and/or labeled for a particular video clip segment. For example, sexual intercourse may be a type of prurient activity that is scored and labeled accordingly, while a sub-label may indicate that nudity was shown during the sexual intercourse activity. In another example, another sub-label may indicate that the sexual intercourse was associated with pedophiliac activity. Any suitable labels and/or sub-labels may be utilized and/or associated with a score indicating a likelihood of the particular prurient activity.

In another example of a type of labeling, a particular type of prurient activity may be automatically labeled with a rating as more or less severe (e.g., along a scale of severity). For example, a scene showing two nude people having sexual intercourse may be labeled as more severe than showing two partially clothed people that are having sexual intercourse. In some embodiments, as described further herein, a user (e.g., a compliance officer, or end-user) may confirm whether automatic labeling performed by the detection system 101 is accurate. In some embodiments, the user may modify and/or add a new label (e.g., a new rating) to the video.

Continuing with the illustration of diagram 100, upon determining the score for the video clip segment 104, the detection system 101 may determine whether the score matches a predefined threshold value (e.g., 90%). If so, the detection system 101 may provide the video clip segment 104 for presentation on the GUI 108. For example, the video clip segment 104 may be presented as video clip segment 112 within GUI 108, as described further herein.

Turning to the GUI 108 for further illustration, the GUI 108 may show a dashboard presentation. Upon receiving a selection of a particular video clip segment (e.g., video clip segment 112), the dashboard may enable presentation of the particular video clip segment, for example, within a large screen presentation window 110 of the dashboard. In this example, the presentation window 110 may show a particular type of prurient activity (e.g., erotic dancing). As described herein, although, presentation window 110 may show individuals that are partially nude, embodiments should not be construed to be so limited. For example, the individuals shown in presentation window 110 may otherwise be clothed while erotic dancing is being performed. In this example, the detection system 101 may detect that a type of prurient activity is likely shown in the video clip segment 104 between two clothed people, and may thus provide a corresponding video clip segment for presentation in the dashboard of the GUI 108.

In some embodiments, video clip segment 112 may represent one of a plurality of video clip segments that are generated from the video clip segment 104 and/or available for presentation via the GUI 108, as described herein. In some embodiments, video clip segment 112 may be associated with a particular confidence level for the particular segment (e.g., 99% confidence, as depicted with respect to video clip segment 112). This may indicate a confidence level that the particular video clip segment contains prurient activity of a particular type. In some embodiments, the video clip segment 112 may further indicate a timestamp of a thumbnail of the video clip segment 112 shown in the GUI 108 (e.g., "00:03:25"). In one example, this thumbnail may correspond to a frame of a portion of video content within the video clip segment that has a high probability of showing prurient activity. In some embodiments, by showing a thumbnail and/or timestamp associated with a high probability of showing prurient activity, an agent (e.g., a human operator) may be able to more efficiently review the video clip segment. In some embodiments, the GUI 108 may receive input to select (e.g., via a click or tap) the thumbnail, upon which the video clip segment may be presented within the large screen presentation window 110. In some embodiments, this may enable the agent to view the surrounding video content associated with the thumbnail (and/or other portions of the video clip segment 112), to determine with confidence if the video clip segment contains content showing a type of prurient activity. The agent may scan through frames of the video clip segment to further increase the analysis velocity. In this way, techniques may enable a more efficient compliance review of portions of a video clip segment 112 (e.g., and/or video file 102) that are flagged as potentially showing one or more types of prurient activity.

It should be understood that the dashboard shown via GUI 108 is one example application of techniques described herein, for example, whereby a compliance officer may efficiently analyzed video contents flagged by the detection system 101. However, embodiments should not be construed to be so limited. For example, in another scenario (e.g., described further in reference to FIG. 6), the GUI 108 may represent a user application interface, whereby an end-user (e.g., a parent of a young child) may be shown video clip segments that may not be suitable for a general audience, based on the analysis of detection system 101. The end-user may thus be able to quickly evaluate whether a video title (e.g., a movie) is appropriate for their child's viewing. In some embodiments, the GUI 108 may enable a user to filter video clip segments by type of content. For example, the user may filter to see primarily video content that shows particular types of prurient activity. Any suitable variations of presentation of video clips and/or video clip segments may be performed via techniques described herein.

Figure 2:
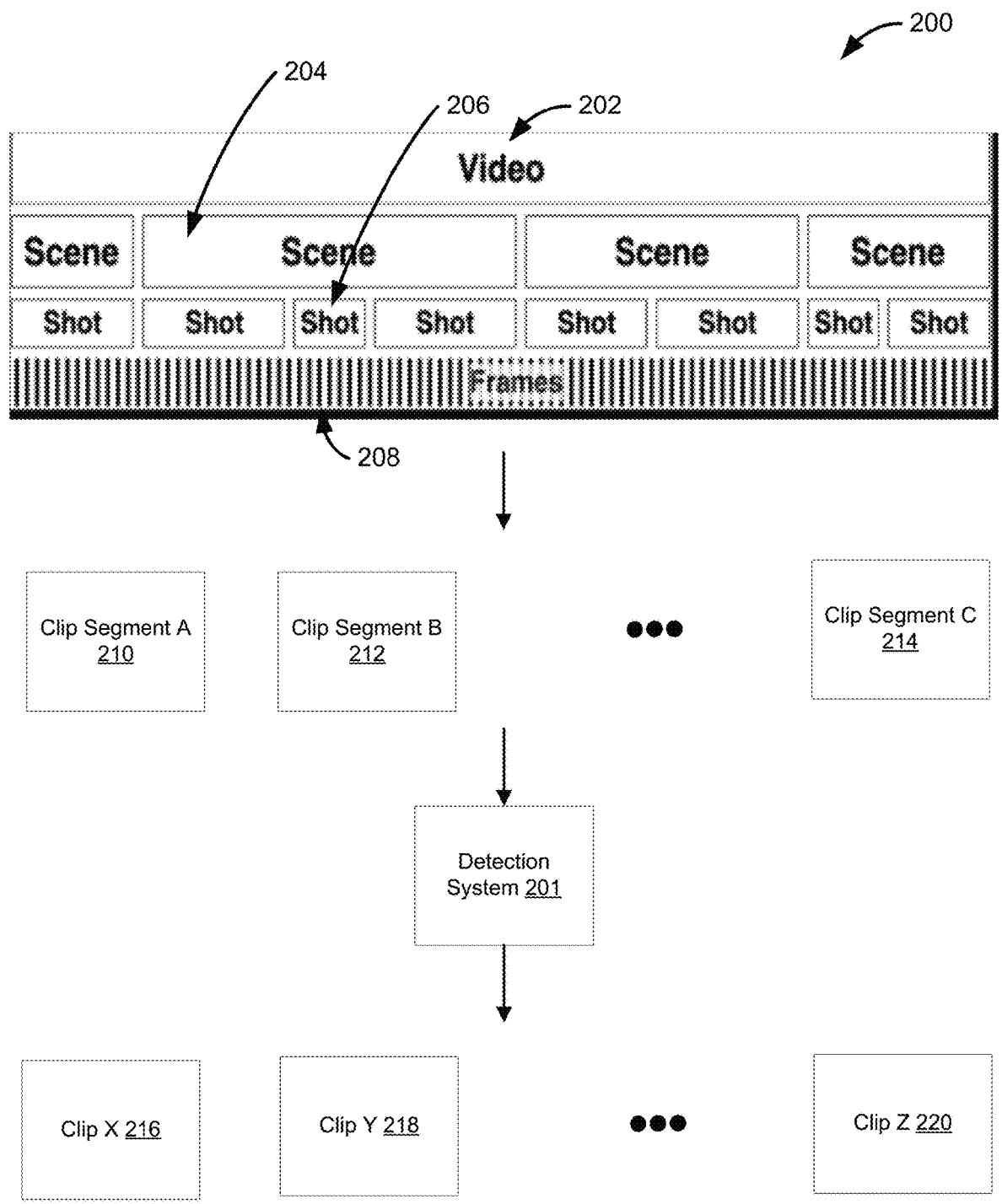
FIG. 2 is a block diagram illustrating an example technique for generating one or more video clips based on detecting if a video content shows a type of prurient activity, in accordance with various embodiments.

FIG. 2 is a block diagram illustrating an example technique for generating one or more video clips based on detecting if a video content shows a type of prurient activity, in accordance with various embodiments. In diagram 200 of FIG. 2, a video content 202 is illustrated, which may be similar to video file 102 of FIG. 1. In this example, the video content 202 (e.g., a movie title) may include one or more scenes. In some embodiments, a scene may be semantically defined, for example, including one or more shots that have semantic meaning (e.g., defined by a director of the movie). For example, scene 204 may be one of the scenes of the video content 202, and may include at least three shots, including shot 206. In some embodiments, a shot (e.g., shot 206) may correspond to a sequence of frames unbroken by editing. For example, the shot 206 may include a sequence of frames 208.

In some embodiments, a video clip segment (e.g., clip segment A 210, clip segment B, 212, or clip segment C 214, etc.) of the video content 202 may include a sequence of one or more frames, each video clip segment having a start and stop time among the frames of the video content 202. In some embodiments, the start and stop times for a particular video clip segment may be independent (or dependent) of particular shot and/or scene boundaries. For example, video clip segment A 210 (e.g., which may be similar to video clip segment 104 of FIG. 1) may span at least a portion of two shots, while video clip segment B 212 may span at least a portion of three shots. In some embodiments, a video clip segment may be of any suitable length (e.g., the entire video content 202, or a suitable subset of a sequence of frames). In some embodiments, a plurality of video clip segments may be used to train a detection system 201, for example, to be able to detect prurient activity within a short video clip segment (e.g., detecting prurient activity within a five second clip).

In some embodiments, the detection system 201 (e.g., which may be similar to detection system 101 of FIG. 1) may receive a video clip segment (e.g., video clip segment A 210) and extract frames of the video clip segment. As described herein, the detection system 201 may analyze a sequential subset (e.g., a plurality, which may be all) of the frames of the video clip segment to generate a score indicating a likelihood that the video clip segment A 210 shows a type of prurient activity of a plurality of prurient activity types. If the score matches a particular threshold value (e.g., 95%), then the detection system 201 may determine that the video clip segment A 210 may be a candidate for further review (e.g., by a human operator).

In some embodiments, the detection system 201 may aggregate one or more video clip segments into a video clip. For example, suppose that the original video content 202 is spliced into a plurality of video clip segments (e.g., including video clip segment A 210, video clip segment B 212, video clip segment C 214, etc.). In one example, each video clip segment may be a short clip (e.g., five seconds, ten seconds). Suppose further that at least video clip segment A 210 is determined by the detection system 201 to match a particular threshold value (e.g., being likely to show prurient content). In this example, suppose that video clip segments B 212 and video clip segment C 214 do not match the particular threshold value (e.g., not being likely to show prurient content). In some embodiments, the detection system 201 may aggregate at least the three video clip segments together to produce a video clip (e.g., video clip X 216). For example, video clip X 216 may be a one-minute long clip. In this example, the video clip X may be labeled as showing prurient content based on determining that at least video clip segment A 210 likely shows prurient content. Similarly video clip Y 218 and video clip Z 220 may respectively correspond to aggregated video content from a plurality video segments. In some embodiments, this method of aggregating video content may be performed to facilitate (e.g., simplify) a subsequent compliance review process by a human operator (e.g., via a GUI-based dashboard presentation, as shown by GUI 108 of FIG. 1). For example, fewer clips may be presented for review. In some embodiments, each aggregated clip may indicate (e.g., visually and/or by text label) particular portions of the aggregated clip that may likely show prurient content.

It should be understood that any suitable method of splicing and/or aggregating video content may be performed via techniques described herein. For example, the detection system 201 may detect a plurality of activities within a single video clip (and/or video clip segment). In this example, the detection system 201 may further splice the video content into a plurality of video clips, each video clip showing a particular prurient activity.

Figure 3:
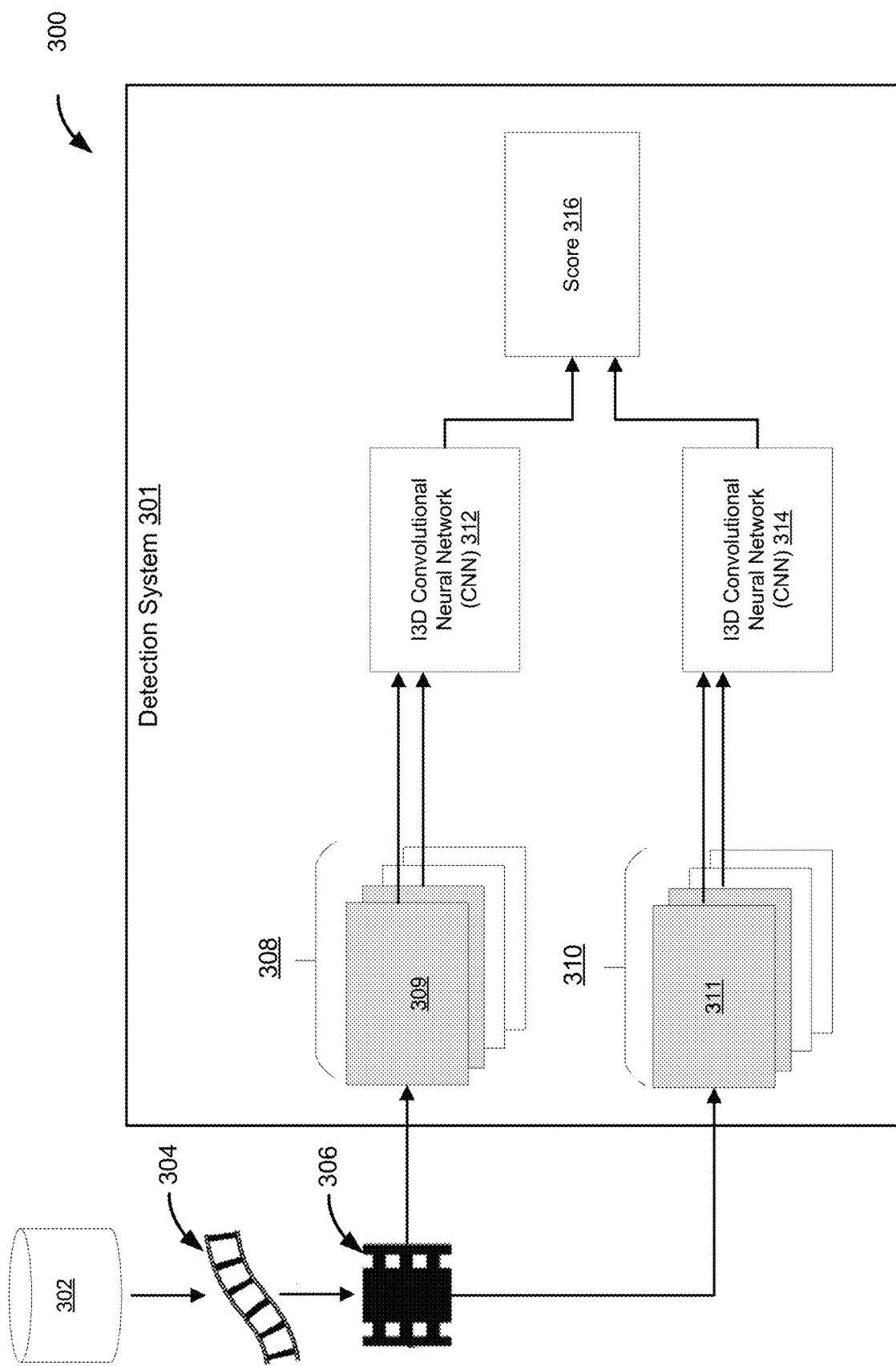
FIG. 3 is a block diagram illustrating an example architecture of a detection system, in accordance with various embodiments.

FIG. 3 is a block diagram illustrating an example architecture of a detection system, in accordance with various embodiments. In diagram 300 of FIG. 3, a data store 302, a video title 304, a video clip segment 306, and a detection system 301 (e.g., which may be similar to detection system 101) are depicted. The data store 302 may be any suitable data repository that may receive and/or store video content (e.g., movies, home videos, etc.), for example, by a multimedia distribution service. As an example, the data store 302 may contain the video title 304, which may be recently uploaded to the data store 302 for further compliance evaluation, to ensure that the video title 304 conforms to regional standards and/or otherwise is appropriate for a particular user audience. The video title 304 may be spliced into a plurality of video clip segments, including video clip segment 306, which may be similar to any of the video clip segments (and/or video clips) described in reference to FIG. 2 (e.g., video clip segment A 210, video clip segment B 212, etc.). As described further herein, the detection system 301 may receive the video clip segment 306, analyze the video clip segment 306, and then output a score 316.

Turning to the architecture of detection system 301 in further detail, in some embodiments, the detection system 301 may utilize a machine learning model. In one example, the machine learning model may utilize an ML model architecture (e.g., a two-stream inflated 3D convolutional neural network ("I3D")) that is similar to as described by Joao Carreira and Andrew Zisserman, "Quo Vadis, Action Recognition? A New Model and the Kinetics Dataset," arXiv:1705.07750v3 [cs.CV] 12 Feb. 2018. For example, the ML model architecture may be trained to recognize specific types of activity (e.g., prurient activity types). Utilizing the I3D model architecture as an example ML model, the I3D ML model architecture may include two streams. A first stream may include a first neural network (e.g., a convolutional neural network (CNN) 312) that is trained to learn motion (e.g., activity) features from Red-Green-Blue (RGB) inputs from frames of the video clip segment 306 directly. A second stream may include a second neural network (e.g., a CNN 314) that may be trained based on optical flow inputs that carry optimized, smooth flow information (e.g., based on outputs from one or more optical flow algorithms that operate on the video clip segment 306). In some embodiments, both the CNN 312 and the CNN 314 may be trained separately (or together). In some embodiments, the outputs of both CNNs may be merged together (e.g., averaged together) to produce the score 316 for the ML model. Although examples described herein may primarily be described in the context of utilizing an I3D model architecture, it should be understood that any suitable machine learning model may be used to perform techniques described herein (e.g., I3D using Long Short Term Memory (LSTM), two-dimensional CNNs, etc.).

Turning to the operations of a CNN (e.g., CNN 312 and/or CNN 314) of the ML model of detection system 301 in further detail, and, continuing with the example above, the detection system 301 may receive the video clip segment 306, which may include a sequence of frames (e.g., frames 1 to K). Using CNN 312 as a representative CNN, the CNN 312 may extract a portion of frames (e.g., a first sequential subset 309 of frames, which correspond to the shaded frames in diagram 300) from among a sequence of frames 308 of the video clip segment 306 (frames 1 to K). In some embodiments, this first sequential subset 309 may be associated with a movement (e.g., activity) shown in the video clip segment 306. Accordingly, the first sequential subset 309 of frames may be associated with a temporal dimension. In some embodiments, the first sequential subset 309 of frames may correspond to a similar (e.g., same) number of frames as the sequence of frames 308.

In some embodiments, the CNN 312 may further determine a portion of the first sequential subset 309 (e.g., a receptive field), which may correspond to a three-dimensional data object (e.g., including a height dimension, a width dimension, and a temporal dimension). In some embodiments, the height dimension may be associated with a portion of the total frame height (e.g., a number of pixels). Similarly, the width dimension may be associated with a portion of the total frame width (e.g., a number of pixels). The receptive field may be associated with a depth that corresponds to a subset of the number of frames of the first sequential subset 309. This depth may further correspond to a temporal dimension of the receptive field.

In some embodiments, the CNN 312 may correspondingly apply one or more strides of convolution and/or pooling operators to the first sequential subset 309 of frames and/or receptive fields of the first sequential subset 309. For example, the CNN 312 may utilize three-dimensional filters and/or pooling kernels, thus endowing them with an additional temporal dimension. The additional temporal dimension may enable the CNN 312 to more accurately and/or efficiently analyze activity (e.g., movement over time) shown by a plurality of frames of the first sequential subset 309 of video clip segment 306. In some embodiments, the three-dimensional filters may be applied to a plurality of receptive fields (e.g., including overlapping receptive fields) of the first sequential subset 309. In some embodiments, the CNN 312 may analyze a plurality of sequential subsets (e.g., overlapping subsets) of the sequence of frames 308. In some embodiments, an inception module may also be executed one or more times as part of the CNN 312 model architecture, for example, to enable more efficient computation. In some embodiments, this process may be used to generate one or more feature maps that are associated with activity shown by the sequence of frames. In some embodiments, these one or more feature maps may be used to generate a first score.

Similarly, with respect to the second stream, CNN 314 may analyze a first sequential subset 311 of a sequence of frames 310 (e.g., a similar (e.g., same) sequence of frames as the sequence of frames 308). In some embodiments, the CNN 314 may analyze a plurality of sequential subsets of the sequence of frames 310 (e.g., overlapping subsets) to generate a second score. As described above, the first score (e.g., generated by CNN 312) and the second score (e.g., generated by CNN 314) may be merged together to generate the score 316. In some embodiments, the score 316 may be a value between 0 and 1. For example, the score may correspond to a binary classification of whether the video clip segment 306 shows (or does not show) any type of prurient activity among a plurality of potential prurient activity types.

As described herein, in some embodiments, the detection system 301 may generate a plurality of scores. For example, in some embodiments, each score may be associated with a likelihood that the video clip segment 306 shows a particular type of prurient activity. In this way, the detection system 301 may enable videos to be labeled, sorted, and/or viewed according to particular types of prurient activity.

In some embodiments, the CNNs of the detection system 301 may be pre-trained to detect actions using a Kinetics Human Action Recognition Video Dataset. See Kay W, Carreira J, Simonyan K, et. al., The Kinetics Human Action Recognition Video Dataset. 2017. As described further herein (e.g., with respect to FIG. 4), the CNNs may further be trained to recognize specific prurient activity types. In some embodiments, where the machine learning model of detection system 301 outputs a binary classification score between 0 and 1 (e.g., indicating a likelihood of whether any type of prurient activity is shown in the video clip segment), the machine learning model may be trained to recognize any type of prurient activity among a plurality of predefined types of prurient activities. In another example, where the machine learning model may contain a plurality of models (e.g., sub-models) that respectively output a score associated with a likelihood of a particular type of prurient activity, the sub-models may respectively be trained to recognize the particular type of prurient activity.

Figure 4:
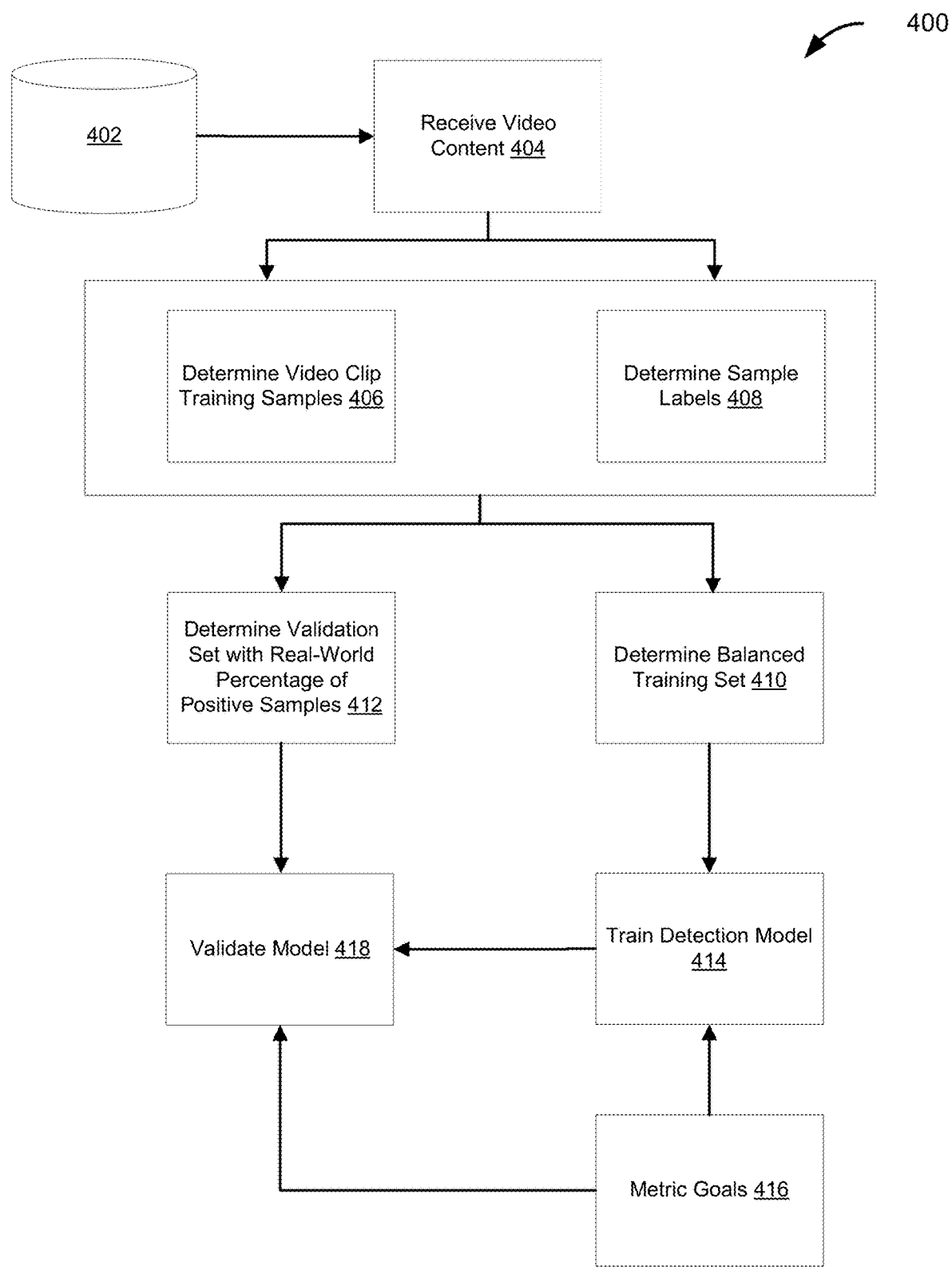
FIG. 4 is a block diagram illustrating an example process for training a machine learning (ML) model of a detection system, in accordance with various embodiments.

FIG. 4 is a block diagram illustrating an example process for training a machine learning (ML) model of a detection system, in accordance with various embodiments. In flow diagram 400 of FIG. 4, the process may start at block 404 by a computer system (e.g., detection system 301) receiving video content from a data store 402. For example, the data store 402 may include a repository of videos (e.g., movies, home videos, videos drawn from a public repository, etc.). At least a portion of the video contents show various types of prurient activity, as described herein.

At block 406, the process includes determining video clip training samples. For example, the detection system may generate a plurality of video clip segments (e.g., shorter clips, such as five seconds length) from the video content received at block 404. For example, the detection system may splice a movie title (and/or other video contents) into a set of shorter video clip segments to be used as training data.

At block 408, the process includes determining training sample labels for the training samples. For example, in one embodiment, where the machine learning model is trained to perform binary classification (e.g., indicating whether a particular video content shows (or doesn't show) any type of prurient activity), a ground truth label may be determined for a particular video clip segment training sample (e.g., "Positive" (shows prurient activity), or "Negative" (doesn't show prurient activity)). In some embodiments, ground truth labels may be determined for a portion (e.g., all) of the training samples of block 406. In some embodiments, ground truth labels may indicate a particular type (and/or sub-type) of prurient activity for a given video clip segment (e.g., "Sexual Intercourse", "Including Nudity," etc.). In some embodiments, a portion of the ground truth labeling process of block 408 may be automatically performed. For example, consider a case where the detection system includes a first machine learning model that is trained to perform binary classification on a video content, indicating whether the video content contains any type of prurient activity or not. Based on the output of this first ML model, a set of video contents may be sub-divided between those that are likely to show prurient activity and those that aren't. Then, the set of contents that are likely to show prurient activity may be further labeled (e.g., automatically, and/or with manual inspection) according to a particular type of prurient activity. Any suitable combination of manual or automatically labeling may be performed according to techniques described herein.

At block 410, the detection system may determine a balanced training data set from among the training samples (and corresponding sample labels). For example, in some embodiments, due in part to the subject matter of the activity that the ML model is being trained to recognize, the real-world number of video contents that show prurient activity may be imbalanced when compared to the real-world number of video contents that do not show prurient activity (e.g., substantially less prurient content as a percentage of the total number of real-world video contents existing). In some embodiments, to account for this natural imbalance in the real-world, the detection system may determine if a difference between the number of samples showing prurient content and the number of samples not showing prurient content is within a predefined threshold difference (e.g., 1%, 5%, etc.). If yes, then the detection system may determine to train the ML model via the balanced training data set at block 414. If no, the detection system may adjust (e.g., re-balance) the proportion of positive versus negative samples. For example, the detection system may down-sample the number of negative video contents. In some embodiments, the ratio of positive to negative samples that is used for training may be any suitable ratio (e.g., a positive to negative ratio of close to 1:2).

At block 412, the detection system may correspondingly determine a validation test set that includes a real-world percentage of positive samples. For example, suppose that the real-world ratio of video contents that show prurient activity is a positive to negative ratio of 1:20). In this example, block 412 may include the detection system determining a validation set of a similar positive to negative ratio (e.g., close to 1:20), which may be used to evaluate the recall and/or precision of the trained detection model on real-world data.

At block 414, the detection system may train the machine learning detection model, for example, similar to as described in reference to FIG. 3. The ML model may be trained based on the training data set. In some embodiments, the ML model may be trained based in part on metric goals 416. For example, the detection system may determine a target recall rate (e.g., 97%) and/or a target precision rate (e.g., 50%). In some embodiments, the detection system may adjust the ratio of positive training samples to negative training samples until the metric goals are reached. It should be understood that any suitable metric goals 416 may be evaluated when training the model and/or during subsequent execution of the trained model.

At block 418, the detection system may validate the model. For example, the detection system may utilize the validation training set determined at block 412 to perform the validation. The detection system may also determine whether the metric goals 416 are still met when run against the validation set (and/or other test data). With this training method, techniques may more efficiently and/or accurately train a ML model in cases where the real-world includes data that may be naturally imbalanced (e.g., less positive cases of video content showing prurient activity than negative cases that do not show prurient activity).

Figure 5:
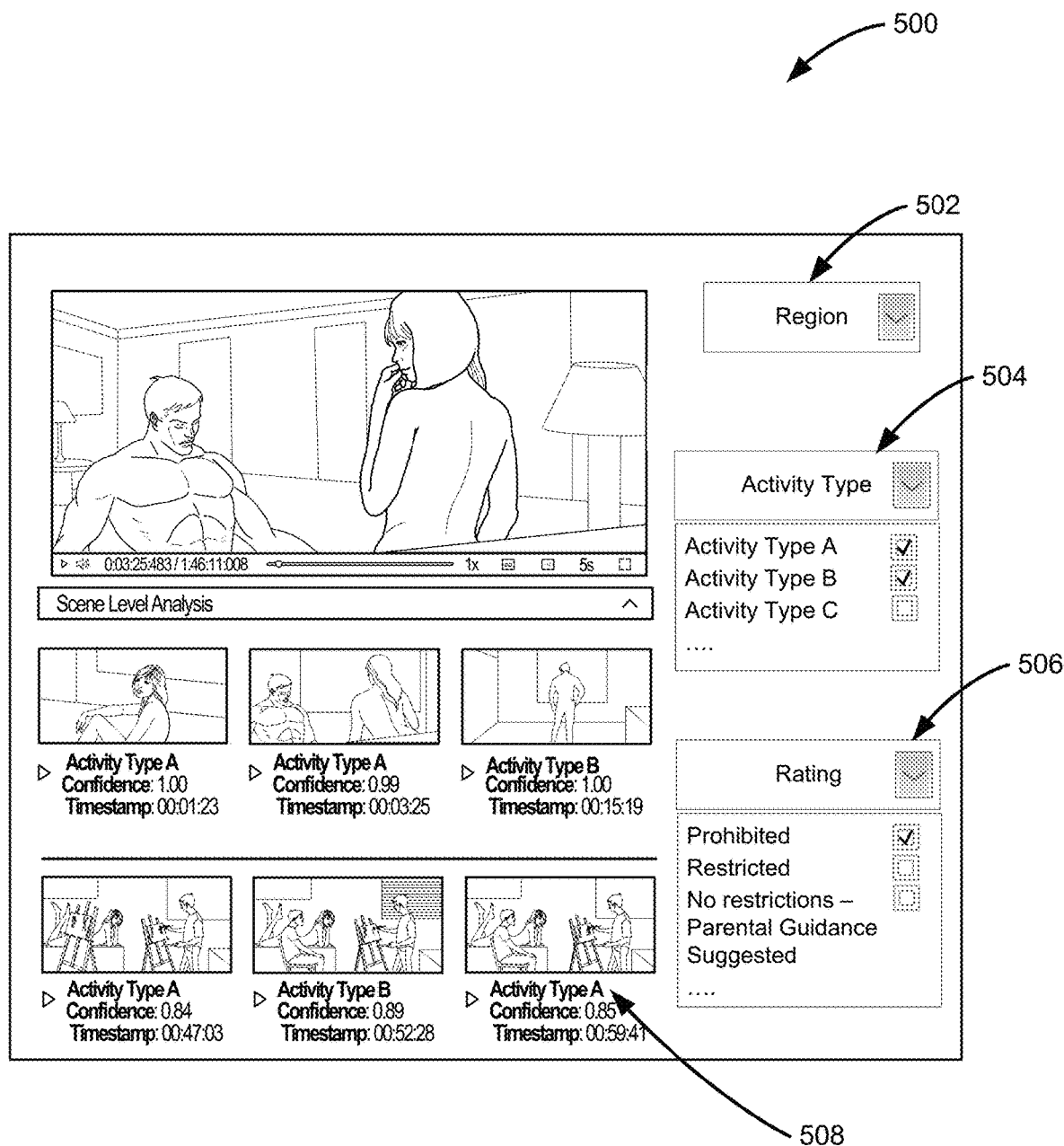
FIG. 5 illustrates a graphical user interface (GUI) for presenting video content showing a type of prurient activity, in accordance with various embodiments.

FIG. 5 illustrates a graphical user interface (GUI) 500 for presenting video content showing a type of prurient activity, in accordance with various embodiments. In FIG. 5, the GUI 500 may correspond to an example dashboard interface of a user device. In one example, the user device may be associated with a human compliance operator (e.g., of a multimedia distribution service) tasked with performing a compliance evaluation of video contents that are candidates for publishing by the multimedia distribution service. The dashboard may present video content and/or receive inputs from the compliance operator to be used in performing the compliance evaluation. In some embodiments, GUI 500 and/or video contents presented via the GUI 500 may be provided by a detection system (and/or associated system) described herein.

Turning to the dashboard presented by GUI 500 in further detail, the dashboard may include a presentation window, similar to presentation window 110 of FIG. 1. Also, the dashboard may also show one or more video clips (e.g., video clip segments), similar to as described in reference to FIG. 1. In this example, note that video clip segment 508 (e.g., which may representative of other video clip segments depicted) is labeled as likely showing a particular type of prurient activity (e.g., "Activity Type A," which may be any suitable activity, such as erotic dancing or strip teasing), based on the output of one or more ML models of a detection system, as described herein. The confidence in this case is 85%, and is indicated to be shown at a particular timestamp (e.g., 00:59:41, which may be a timestamp for the particular movie from which the video clip segment was generated). Accordingly, upon receiving a selection of the thumbnail for video clip segment 508, the presentation window may display content for that particular video clip segment 508, whereby the compliance evaluator may evaluate the content.

In some embodiments, the GUI 500 may enable one or more filtering options and/or input selections, based in part on the outputs from the machine learning model. For example, a region filter 502 may enable selection of a particular region. For example, suppose that the region filter 502 corresponds to a drop-down menu that enables a selection of a particular region (e.g., Japan, India, etc.). As described herein a particular region may be associated with a set of compliance rules, for example, indicating one or more types of prurient activity that are not suitable for distribution in the particular region. Upon selection of a particular region (e.g., India), the dashboard may automatically filter out video clip segments that are not likely to be violating Indian compliance rules, In this example, the video clip segment 508 may correspond to a video clip segment likely showing a type of prurient activity that is prohibited from distribution in India. In this way, techniques may enable more efficient evaluation of video content according to different sets of compliance rules for different regions. This may be enabled based in part on the ML model(s) of a detection system predicting specific types of prurient activity.

In another example, an activity type filter 504 may enable further filtering of video content presented via the GUI 500. For example, suppose that upon selection of "India" as the target distribution region, the detection system automatically determines that "Activity Type A" and "Activity Type B" are two prurient activity types that are prohibited from distribution in India. Accordingly, the list of video clip segments shown only includes video clip segments likely to show prurient activity of those two types. However, suppose that, for business reasons, the compliance operator wants to add a new prurient activity type to be evaluated (e.g., "Activity Type C"). Upon receiving selection of "Activity Type C" via the activity type filter 504, the GUI 500 may be updated to also show video clip segments likely showing that activity type.

In an example of an input selection/filtering option, a rating filter 506 may enable filtering out (or including) content according to a severity rating (or other suitable rating system). For example, suppose that the machine learning model of the detection system outputs a severity label for a particular video clip segment (e.g., in addition to the score for that video content). In one example, the severity label may be associated with a level of appropriateness for a general audience. For example, suppose that video clip segment 508 is determined to likely show strip teasing (e.g., as "Activity A"). In this example, the strip teasing is being performed by a nude individual who may also be exhibiting other gratuitous depictions of sexual activity (e.g., touching the genitalia). Here, the detection system may automatically determine that the video clip segment 508 is likely to be prohibited from distribution to one or more regions (e.g., India), based in part on characteristics and/or sub-types of the prurient activity displayed. Accordingly, if the "Prohibited" filter is selected, the rating filter 506 may automatically show those videos that are automatically rated with a particular severity rating associated with prohibition in the selected region (e.g., India).

It should be understood that the GUI presentation format, example filters, and/or input mechanisms described with respect to FIG. 5 are non-limiting. For example, in some embodiments, the GUI 500 may enable the compliance officer to manually indicate and/or confirm one or more characteristics of a video clip segment. For example, in some embodiments, upon reviewing the video clip segment 508, the compliance officer may input a selection of a particular rating (e.g., "Prohibited") for a given region. In another example, the GUI 500 may enable the compliance officer to define what types of prurient activities are prohibited from distribution to one or more regions. In this way, techniques described herein enable more efficient and accurate performance of compliance verification over a wide range of video types and/or for distribution to a range of regions and/or customer types.

Figure 6:
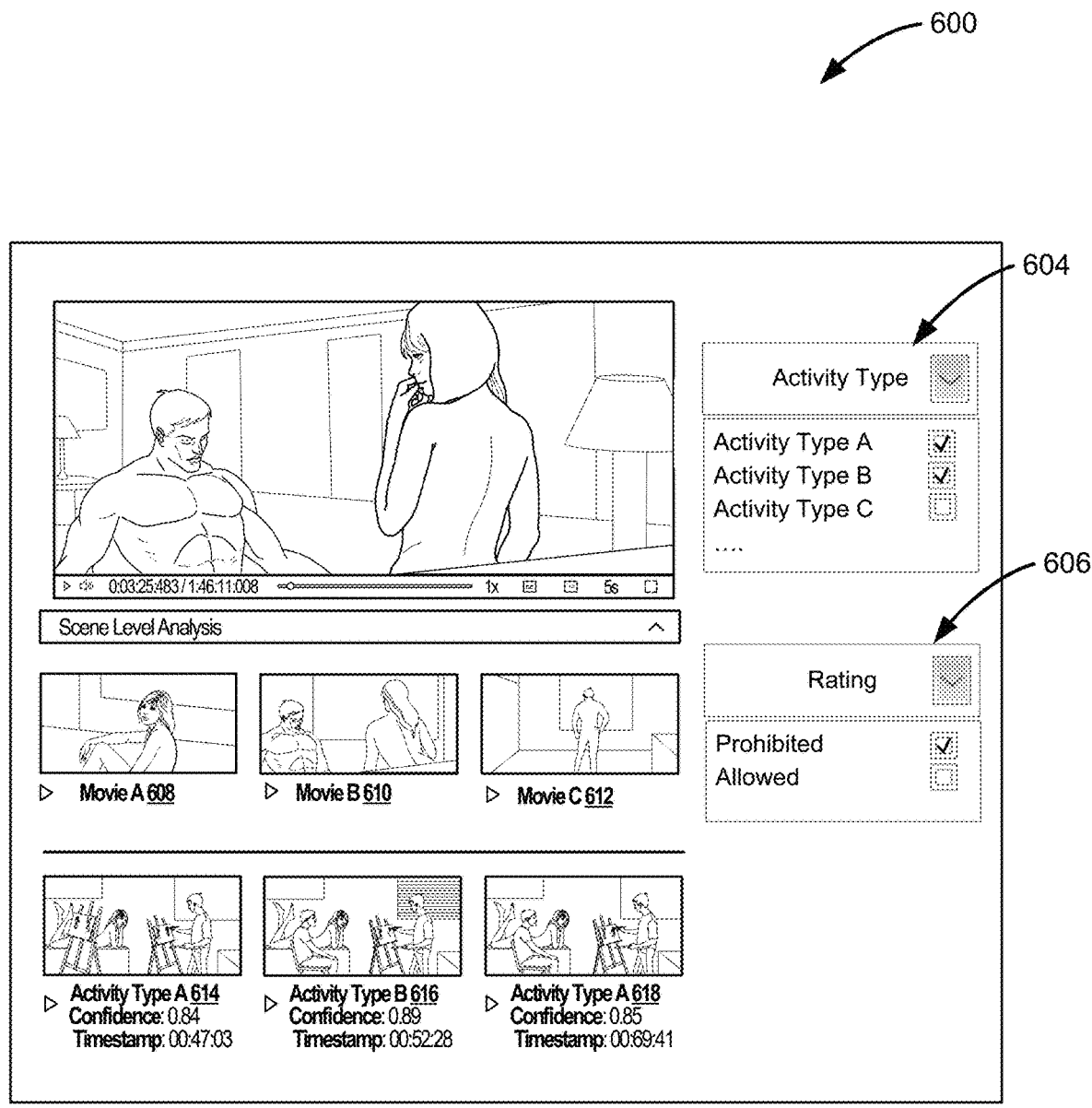
FIG. 6 is illustrates another GUI for presenting video content showing a type of prurient activity, in accordance with various embodiments.

FIG. 6 is illustrates another GUI for presenting video content showing a type of prurient activity, in accordance with various embodiments. In FIG. 6, the GUI 600 may correspond to an example dashboard interface of a user device. In one example, the user device may be associated with an end-user (e.g., a child guardian). The end-user may want to evaluate whether certain movie titles are suitable for presentation to a child of the child guardian. In some embodiments, GUI 600 and/or video contents presented via the GUI 600 may be provided by a detection system (and/or associated system) described herein.

Turning to the dashboard presented by GUI 600 in further detail, the dashboard may include a presentation window, similar to presentation window 110 of FIG. 1. In this example, the end user may be presented with a list of movie titles, including, for example, "Movie A 608," "Movie B 610," "Movie C 612," etc. Each of these may correspond to movie titles that are recommended by the system for watching by the family of the end-user.

Upon selection of a particular movie title (e.g., Movie A 608"), a list of video clip segments may be presented in the GUI 600, for example, below the list of recommended movie titles. For example, selectable thumbnails for video clip segment 614, video clip segment 616, and video clip segment 618 may be presented. In this example, the detection system may identify video clip segment 614 and 618 as being likely to show prurient activity of "Type A" with a confidence level of 84% and 85%, respectively. Meanwhile, video clip segment 616 may be likely to show prurient activity of "Type B" with a confidence level of 89%.

Meanwhile, the end-user may be presented with options for filtering and/or sorting the video content. For example, the end-user may be able to select from types of prurient activity that they wish to evaluate via an activity type filter 604. For example, suppose that the end-user wants to perform closer evaluation of video content of types A or B, but may not want to evaluate prurient activity of type C. In this example, the detection system may receive an input corresponding to a selection (or de-selection) of activity types from the activity type filter 604. This selection mechanism may be enabled based in part on the detection system having previously detected various types of prurient activity in one or more video clip segments.

In another example, the detection system may present a rating menu 606 (and/or filtering mechanism), that enables the end-user to rate whether a particular move (e.g., Movie A 608) should be prohibited from being presented (e.g., within the home environment and/or by a particular user profile). It should be understood that other features may be provided via the GUI 600 to an end-user based in part on the detection system determining a likelihood of a type of prurient activity in one or more video segments. Some non-limiting examples may include instructing the detection system to not present certain segments of a movie title (e.g., if the segment contains a particular type of prurient activity), instructing the detection system to blur certain portions of a scene that are associated with prurient activity, warning an end-user about an upcoming scene that includes a type of prurient activity, enabling the end-user to easily skip through a particular scene showing prurient activity, etc.

Figure 7:
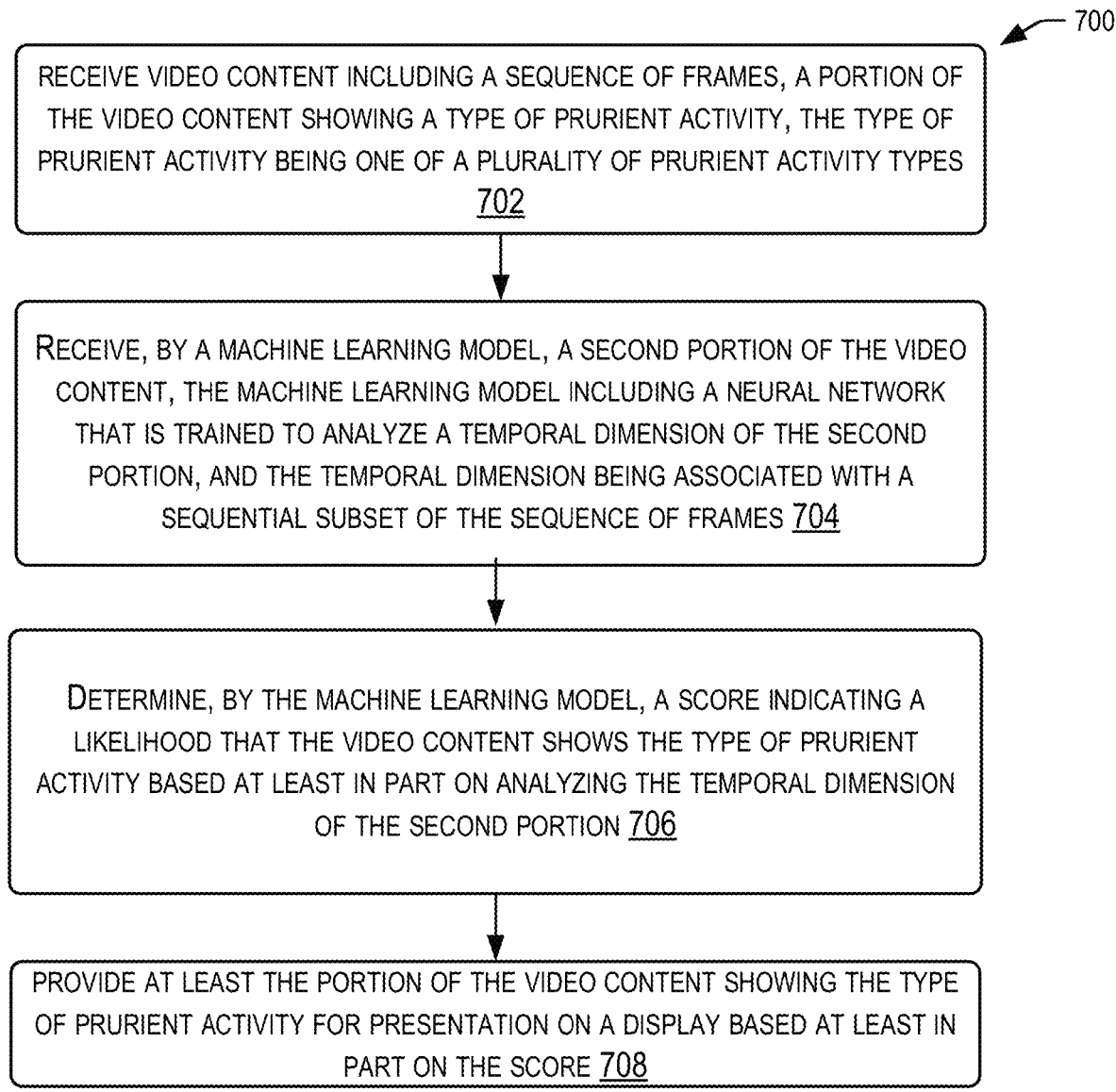
FIG. 7 is a flow diagram illustrating a method for presenting a portion of video content based on determining a likelihood that the portion of the video content shows a type of prurient activity, in accordance with various embodiments.

FIG. 7 is a flow diagram illustrating a method for presenting a portion of video content based on determining a likelihood that the portion of the video content shows a type of prurient activity, in accordance with various embodiments. Process 700 may be performed by any of the detection systems described herein.

Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 702, a detection system receives video content including a sequence of frames. A portion of the video content shows a type of prurient activity, whereby the type of prurient activity is one of a plurality of prurient activity types. In some embodiments, the plurality of prurient activity types includes at least one of: (I) sexual activity involving a plurality of people, or (II) sexual activity by a single person. In some embodiments a prurient activity type may be defined according to any suitable methodology, as described herein. In some embodiments, the portion of the video content includes a plurality of frames that is a subset of the sequence of frames, whereby the subset of the sequence of frames shows a movement over time that corresponds to the type of prurient activity. In some embodiments, the plurality of prurient activity types includes a type of activity that is independent (e.g., absent) of nudity.

At block 704, the detection system receives, by a machine learning model of the detection system, a second portion of the video content. In some embodiments, the machine learning model includes a neural network that is trained to analyze a temporal dimension of the second portion. The temporal dimension may be associated with a sequential subset (e.g., a plurality) of the sequence of frames (e.g., a number of frames of the sequential subset and/or a number of frames of the second portion). In some embodiments, the second portion includes a receptive field that is a three-dimensional data object. In some embodiments, the three-dimensional data object is associated with a height dimension, a width dimension, and the temporal dimension. In some embodiments, the neural network includes convolutional neural network. In some embodiments, a three-dimensional filter is applied to the receptive field to produce at least a portion of a feature map that is associated with the second portion of the video content. In some embodiments, the three-dimensional filter is associated with a height dimension of a frame of the second portion of video content, a depth dimension of the frame of the second portion of video content, and a temporal dimension. In some embodiments, the machine learning model is one of plurality of machine learning models that are respectively trained to output a particular score of the plurality of scores. In some embodiments, the score indicates a likelihood that the video content shows any one of the plurality of prurient activity types. In this case, the machine learning model may be trained based at least in part on training data samples associated with the plurality of prurient activity types.

At block 706, the machine learning model determines a score indicating a likelihood that the video content shows prurient activity corresponding to one of the plurality of prurient activity types. In some embodiments, the prurient activity may be associated with the temporal dimension (e.g., indicating a movement of bodies over time). In some embodiments, the ML model may determine the score based on analyzing a temporal dimension of the second portion. In some embodiments, the ML model may analyze a temporal dimension, respectively, of a plurality of portions of the video content that includes the second portion. In some embodiments, the score is one of a plurality of scores determined by the machine learning model, the plurality of scores respectively corresponding to a likelihood that the video content shows a particular type of prurient activity of the plurality of prurient activity types.

At block 708, the detection system provides at least the portion of the video content showing the type of prurient activity for presentation on a display based at least in part on the score. In some embodiments, the portion corresponds to a video clip segment. In some embodiments, the detection system determines a plurality of sequential video clip segments of the video content, whereby at least the video clip segment is one the plurality of sequential video clip segments. The detection system then may generate a video clip that concatenates the plurality of sequential clip segments together, and then provides the video clip for presentation on the display. In some embodiments, the detection system may generate a plurality of video clips, respectively, showing a prurient activity of the different types of prurient activities. The detection system may then provide the plurality of video clips for presentation on the display of a user device. In some embodiments, the video content is intended for distribution to a particular geographical region, and whereby the portion of the video content is provided for presentation on the display operable for performing a compliance evaluation for distribution to the particular geographical region. In some embodiments, the detection system may receive a request from the user device indicating a selection of a particular region. The particular region may be associated with a set of compliance rules that prohibit a subset of the plurality of prurient activity types from being distributed in the region. The detection system may determine a subset of the plurality of video clips, whereby a video clip of the subset shows a prurient activity of the subset of the plurality of prurient activity types. The detection system may then provide the subset of the plurality of video clips for presentation on the display of the user device. In some embodiments, the detection system may determine a rating for a video clip based on type of prurient activity associated with the video clip. The detection system may provide the video clip for presentation based in part on the rating. In some embodiments, the detection system may receive a request from the user device to update a preference of a user profile (e.g., an end-user profile). In this example, the preference may that a presentation of video content associated with at least one a plurality of video clips will be prohibited or modified from an original presentation format. For example, the user profile may indicate that, upon presenting video content for the end-user (and/or associated family members), the end-user is to be alerted by the system when a type of prurient activity will soon be displayed, and/or given the opportunity to skip ahead.

Figure 8:
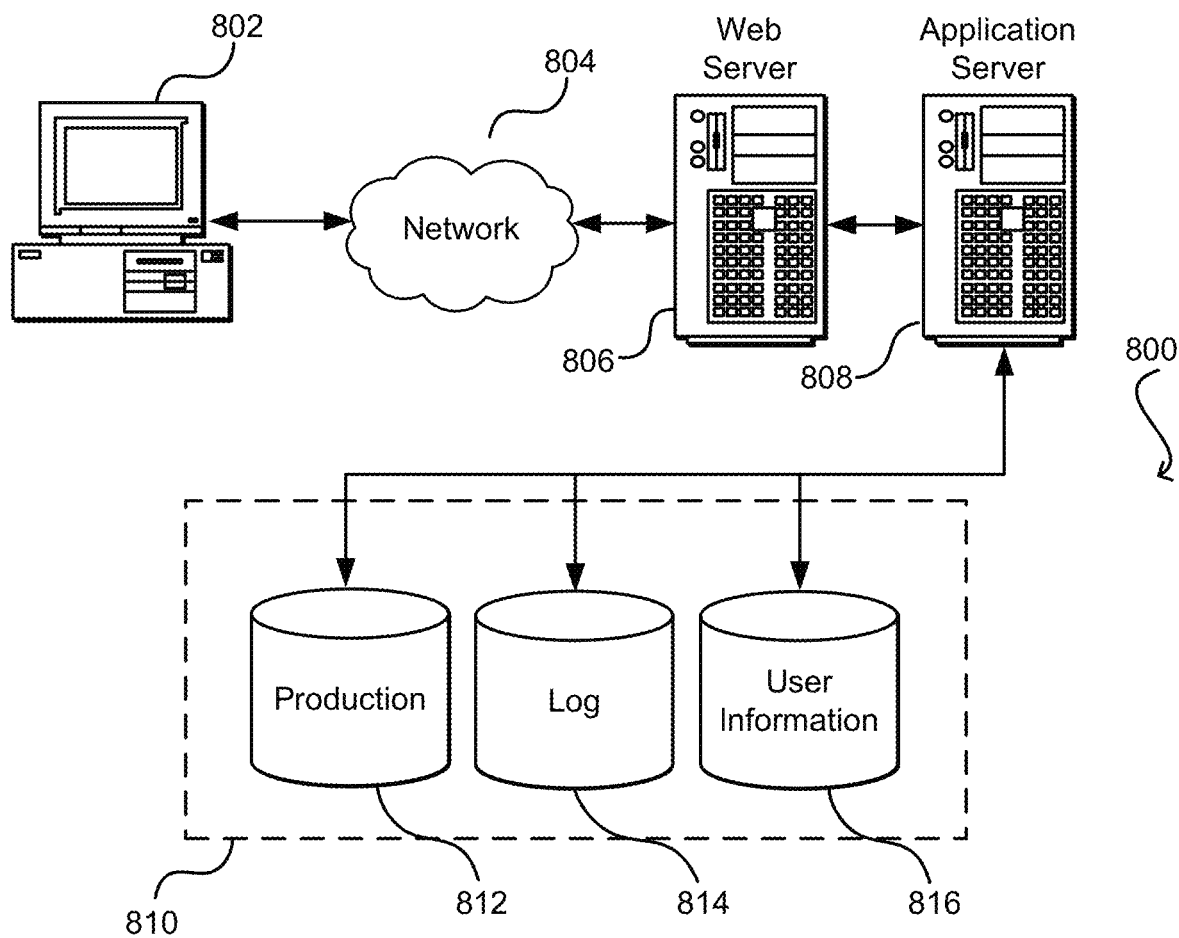
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, video content including a sequence of frames, a portion of the video content showing a type of prurient activity, the type of prurient activity being one of a plurality of prurient activity types, and the video content being intended for distribution to a particular target entity;

receiving, by a machine learning model of the computer system, a second portion of the video content, the machine learning model including a neural network that is trained to apply a three-dimensional filter to the second portion of the video content, the three-dimensional filter associated with a temporal dimension of the second portion of the video content, the second portion including a receptive field that is a three-dimensional data object, the three-dimensional data object associated with at least one of a height dimension, a width dimension, or the temporal dimension that is associated with a sequential subset of the sequence of frames, the three-dimensional filter applied to the receptive field to produce a feature map that is associated with the second portion of the video content, and the feature map representing activity included in the second portion of the video content;

determining, by the machine learning model, a score indicating a likelihood that the video content shows prurient activity corresponding to one of the plurality of prurient activity types based at least in part on applying the three-dimensional filter to portions of the video content that include the second portion and the feature map associated with the second portion;

generating, by the computer system, a video clip that includes the portion of the sequence of frames showing the type of prurient activity based at least in part on the score;

providing, by the computer system, the video clip for presentation on a display for performing a compliance evaluation for distribution to the particular target entity, wherein performing the compliance evaluation for distribution to the particular target entity includes searching through the video clip for a particular type of prurient activity of the plurality of prurient activity types based at least in part on the score associated with the particular type of prurient activity included in the video clip;

receiving, by the computer system and from a user device, a request to update a preference of a user profile associated with the user device, the update to the preference specifying modification to the video content from an original format to provide a warning indicating that the particular type of prurient activity will be displayed within a certain time period; and providing, by the computer system and to the user device, the video clip with the preference of the user profile integrated.

2. The computer-implemented method of claim 1, wherein the portion of the video content includes a plurality of frames that is a subset of the sequence of frames, the subset of the sequence of frames showing a movement over time that corresponds to the type of prurient activity.

3. The computer-implemented method of claim 1, wherein the plurality of prurient activity types includes at least one of: (I) sexual activity involving a plurality of people, or (II) sexual activity by a single person.

4. A computer device, comprising:
a memory comprising computer-executable instructions; and
one or more processors in communication with the memory and configured to access the memory and execute the computer-executable instructions to perform, at least:
receiving video content including a sequence of frames, a portion of the video content showing a type of prurient activity, the type of prurient activity being one of a plurality of prurient activity types;

receiving, by a machine learning model of the computer device, a second portion of the video content, the machine learning model including a neural network that is trained to analyze a temporal dimension of the second portion, and the temporal dimension being associated with a sequential subset of the sequence of frames, the second portion of the video content including a receptive field that is a three-dimensional data object, the three-dimensional data object associated with at least one of a height dimension, a width dimension, or the temporal dimension that is associated with the sequential subset of the sequence of frames, the machine learning model including a convolutional neural network that applies a three-dimensional filter to the receptive field to produce at least a portion of a feature map that is associated with the second portion of the video content, and the feature map representing activity included in the second portion of the video content;

determining, by the machine learning model, a score indicating a likelihood that the video content shows prurient activity corresponding to one of the plurality of prurient activity types and associated with the temporal dimension by applying the three-dimensional filter to the portion of the video content and the feature map associated with the second portion of the video content;

generating a video clip that includes the portion of the sequence of frames showing the type of prurient activity based at least in part on the score;

providing the video clip for presentation on a display for performing a compliance evaluation for distribution to a particular target entity based at least in part on the score, wherein performing the compliance evaluation for distribution to the particular target entity includes searching through the video clip for a particular type of prurient activity of the plurality of prurient activity types based at least in part on the score associated with the particular type of prurient activity included in the video clip;

receiving, from a user device, a request to update a preference of a user profile associated with the user device, the update to the preference specifying modification to the video content from an original format to provide a warning indicating that the particular type of prurient activity will be displayed within a certain time period; and providing, to the user device, the video clip with the preference of the user profile integrated.

5. The computer device of claim 4, wherein the portion corresponds to a video clip segment, and wherein the memory comprises further computer-executable instructions that, when executed by the one or more processors, further causes the computing device to perform, at least:
determine a plurality of sequential video clip segments of the video content, at least the video clip segment being one the plurality of sequential video clip segments, wherein generating the video clip includes concatenating the plurality of sequential video clip segments together; and
provide the video clip for presentation on the display.

6. The computer device of claim 4, wherein the plurality of prurient activity types includes a type of activity that is independent of nudity.

7. The computer device of claim 4, wherein the portion of the video content includes a plurality of frames that is a subset of the sequence of frames, the subset of the sequence of frames showing a movement over time that corresponds to the type of prurient activity.

8. The computer device of claim 4, wherein the score is one of a plurality of scores determined by the machine learning model, the plurality of scores respectively corresponding to a likelihood that the video content shows a particular type of prurient activity of the plurality of prurient activity types.

9. The computer device of claim 8, wherein the machine learning model is one of plurality of machine learning models that are respectively trained to output a particular score of the plurality of scores.

10. The computer device of claim 4, wherein the score indicates a likelihood that the video content shows any one of the plurality of prurient activity types, and wherein the machine learning model is trained based at least in part on training data samples associated with the plurality of prurient activity types.

11. The computer device of claim 4, wherein the video content is intended for distribution to a particular geographical region, and wherein the portion of the video content is provided for presentation on the display operable for performing the compliance evaluation for distribution to the particular geographical region.

12. One or more non-transitory computer-readable storage media comprising computer-executable instructions that, when executed by one or more processors, cause the one or more processors to perform, at least:
receiving video content including a sequence of frames, a portion of the video content showing a type of prurient activity, the type of prurient activity being one of a plurality of prurient activity types;
receiving, by a machine learning model, a second portion of the video content, the machine learning model including a neural network that is trained to analyze a temporal dimension of the second portion, and the temporal dimension being associated with a sequential subset of the sequence of frames, the second portion of the video content including a receptive field that is a three-dimensional data object, the three-dimensional data object associated with at least one of a height dimension, a width dimension, or the temporal dimension that is associated with the sequential subset of the sequence of frames, the machine learning model applying a three-dimensional filter to the receptive field to produce at least a portion of a feature map that is associated with the second portion of the video content, and the feature map representing activity included in the second portion of the video content;
determining, by the machine learning model, a score indicating a likelihood that the video content shows the type of prurient activity based at least in part on analyzing a temporal dimension of the second portion and the feature map associated with the second portion of the video content;
generating a video clip that includes the portion of the sequence of frames showing the type of prurient activity based at least in part on the score;
providing the video clip for presentation on a display for performing a compliance evaluation for distribution to a particular target entity based at least in part on the score, wherein performing the compliance evaluation for distribution to the particular target entity includes searching through the video clip for a particular type of prurient activity of the plurality of prurient activity types based at least in part on the score associated with the particular type of prurient activity included in the video clip;
receiving, from a user device, a request to update a preference of a user profile associated with the user device, the update to the preference specifying modification to the video content from an original format to provide a warning indicating that the particular type of prurient activity will be displayed within a certain time period; and
providing, to the user device, the video clip with the preference of the user profile integrated.

13. The one or more non-transitory computer-readable storage media of claim 12, wherein the instructions further comprise:
determining that the video content shows different types of prurient activities;
generating a plurality of video clips, respectively, showing a prurient activity of the different types of prurient activities; and
providing the plurality of video clips for presentation on the display of the user device.

14. The one or more non-transitory computer-readable storage media of claim 13, wherein the instructions further comprise:
receiving a request from the user device indicating a selection of a particular region, the particular region associated with a set of compliance rules that prohibit a subset of the plurality of prurient activity types from being distributed in the particular region;
determining a subset of the plurality of video clips, a video clip of the subset showing a prurient activity of the subset of the plurality of prurient activity types; and
providing the subset of the plurality of video clips for presentation on the display of the user device.

15. The one or more non-transitory computer-readable storage media of claim 13, wherein the instructions further comprise:
determining a rating, respectively, for the plurality of video clips, based at least in part on the type of prurient activity associated with a respective video clip; and
providing the plurality of video clips for presentation on the display based at least in part on the ratings.

* * * * *